(12) United States Patent
Kang (10) Patent No.: US 11,988,292 B2
(45) Date of Patent: May 21, 2024

(54) INTERGRATED CHECK VALVE (71) Applicant: Seong Ill Kang, Seongnam (KR)

(72) Inventor: Seong Ill Kang, Seongnam (KR)

( * ) Notice: Subject to any disclaimer, the term of this patent is extended or adjusted under 35 U.S.C. 154(b) by 183 days.

(21) Appl. No.: 17/424,139

(22) PCT Filed: Jan. 8, 2020

(86) PCT No.: PCT/KR2020/000336
§ 371 (c)(1),
(2) Date: Jul. 19, 2021

(87) PCT Pub. No.: WO2020/153631
PCT Pub. Date: Jul. 30, 2020

(65) Prior Publication Data
US 2022/0099200 A1 Mar. 31, 2022

(30) Foreign Application Priority Data
Jan. 24, 2019 (KR) .................. 10-2019-0008983

(51) Int. Cl.
*F16K 15/02* (2006.01)
*A45D 40/00* (2006.01)
*B65D 47/24* (2006.01)

(52) U.S. Cl.
CPC ........ *F16K 15/026* (2013.01); *A45D 40/0075* (2013.01); *B65D 47/245* (2013.01); *A45D 2200/056* (2013.01)

(58) Field of Classification Search
CPC ..... F16K 15/028; F16K 15/144; F16K 15/026
See application file for complete search history.

(56) References Cited

U.S. PATENT DOCUMENTS 3,389,839 A * 6/1968 Williams ........... B65D 47/2031
222/502
5,727,594 A * 3/1998 Choksi .................. F16K 15/023
137/859

FOREIGN PATENT DOCUMENTS

| JP | 04-034567 U | 3/1992 |
| KR | 20-0261356 Y1 | 1/2002 |
| KR | 20-0302327 Y1 | 1/2003 |
| KR | 20-0335159 Y1 | 12/2003 |

(Continued)

OTHER PUBLICATIONS

English Machine Translation of WO2016/111090 (Year: 2016).*

*Primary Examiner* — Reinaldo Sanchez-Medina
*Assistant Examiner* — Nicole Gardner
(74) *Attorney, Agent, or Firm* — Heedong Chae; Lucem, PC (57) ABSTRACT

The present invention relates to an integrated check valve comprising: a valve body (31) which is a cylindrical member having open upper and lower parts, and which is insertedly provided at the outer periphery of a center hole (21) of a cylinder (20) at which a pump body (10) is provided; and a cylindrical check valve (33) fitted and coupled to the upper surface of the valve body (31) by being connected thereto by means of a connecting strap (32) which is connected to the side surface of the valve body (31). The present invention attaches the valve body to a hole to be opened and closed, and assembles, on the valve body, the check valve connected to the valve body, thereby facilitating the assembly and disassembly of components and maintaining excellent pumping efficiency even when used for a long term.

1 Claim, 6 Drawing Sheets

(56) References Cited

FOREIGN PATENT DOCUMENTS

KR  10-2015-0055785 A     5/2015
WO  WO-2016111090 A1 *  7/2016  ............. B65D 47/20

* cited by examiner

INTERGRATED CHECK VALVE

TECHNICAL FIELD

One aspect of the present disclosure relates to an integrated check valve, and more particularly, to an integrated check valve in which a valve body is attached to a hole to be opened and closed, and a check valve connected to the valve body is assembled on the valve body, thereby facilitating the assembly and disassembly of components and maintaining excellent pumping efficiency even when used for a long term.

BACKGROUND ART

In general, a container for storing and keeping liquid contents such as liquid or gel is provided in a pumping device for smoothly discharging the contents to the outside through an inlet port thereof.

Such a pumping device promotes convenience of use by discharging the contents in the container to the outside by a certain amount, and reduces waste of the contents by suppressing excessive discharge of the contents, and various structures of the pumping device have been proposed and widely used.

In general, as disclosed in Korean Unexamined Patent Publication No. 20-2011-0023299 "Pump Structure of Airless Pump Type Cosmetic Container", a pumping device for a container includes a cap member coupled to the container, a cylinder coupled to the cap member, and a cylinder, a piston member that moves up and down in the cylinder to perform a piston motion, and a pressing member coupled to the piston member to move down the piston member as the pressing member is pressed by a user.

The pumping device according to the related art is inconvenient to assemble the components, and has a structure that is impossible or difficult to disassemble the components once the components are assembled. Therefore, it is difficult to reuse the pumping device of the related art, and when there is a problem in some components, it is necessary to exchange the entire pumping device, instead of exchanging only the problematic components, which is very uneconomical.

In addition, the pumping efficiency of the pumping device depends on the smoothness of the piston motion of the piston member, the adhesion between the piston member and the cylinder member, and the opening and closing function of the check valve according to the piston motion of the piston member. However, there is a problem in the pumping device of the related art in that the adhesion between the piston member and the cylinder member is weakened and the opening and closing function of the check valve is degraded when the pumping device is used for a long period of time, thereby lowering the pumping efficiency.

In addition, the check valve according to the related art cannot be firmly assembled so that the check valve cannot perform the function thereof, that is, there is a high defect rate.

DISCLOSURE

Technical Problem

The present disclosure has been suggested to meet the demand of the related art, and an object of the present disclosure is to provide an integrated check valve in which a valve body is attached to a hole to be opened and closed, and a check valve connected to the valve body is assembled on the valve body, thereby facilitating the assembly and disassembly of components and maintaining excellent pumping efficiency even when used for a long term.

Technical Solution

The integrated check valve according to a first embodiment of the present disclosure includes a valve body (31) which is a cylindrical member having open upper and lower parts, and which is inserted into an outer periphery of a center hole (21) of a cylinder (20) at which a pump body (10) is installed, and a cylindrical check valve (33) fitted and coupled to an upper surface of the valve body (31) while being connected thereto by a connecting strap (32) which is connected to a side surface of the valve body (31).

Here, the cylindrical check valve (33) may include a cylindrical part (33a) having open upper and lower parts, a disc opening and closing part (33b) formed at a center of the cylindrical part (33a) to open and close an upper hole (31a) of the valve body (31), and S-shaped connecting parts (33c) connecting an outer periphery of the disc opening and closing part (33b) and an inner periphery of the cylindrical part (33a) at a plurality of spots.

Advantageous Effects

According to the integrated check valve of the present disclosure, the valve body is attached to the hole to be opened and closed, and the check valve connected to the valve body is assembled on the valve body, thereby facilitating the assembly and disassembly of components and maintaining excellent pumping efficiency even when used for a long term. In addition, the integrated check valve according to the present disclosure can be used independently without being used in the cylinder in which the pump body is mounted, and can also be used in a small pump of 0.03 cc. That is, the integrated check valve according to the present disclosure has the advantage that the integrated check valve itself can serve as a valve even if it is not combined with other components.

BEST MODE

An integrated check valve according to a first aspect of the present disclosure may include a valve body 31 which is a cylindrical member having open upper and lower parts, and which is inserted into an outer periphery of a center hole 21 of a cylinder 20 at which a pump body 10 is installed, and a cylindrical check valve 33 fitted and coupled to an upper surface of the valve body 31 while being connected thereto by a connecting strap 32 which is connected to a side surface of the valve body 31.

MODE FOR INVENTION

Hereinafter, preferred embodiments of the present disclosure will be described with reference to the accompanying drawings so that those skilled in the art can easily implement the present disclosure. It is noted that the reference numbers assigned to the components in the accompanying drawings may be used to designate the same components in other drawings. In addition, in the description of the present disclosure, if it is determined that a detailed description of a related known function or a known configuration may unnecessarily make the subject matter of the present disclosure unclear, the detailed description will be omitted. In addition, certain features presented in the drawings may be enlarged, reduced, or simplified for facilitating the explanation, and the drawings and components thereof may not be necessarily drawn with accurate scale. However, those skilled in the art will readily appreciate these details.

Terms including ordinal numbers such as 'first' and 'second' may be used to describe various elements, but the elements are not limited by the terms. The above terms are used only for the purpose of distinguishing one component from other components. For example, a first component may be referred to as a second component without departing from the scope of the present invention, and similarly, the second component may be referred to as the first component. The term "and/or" includes a combination of a plurality of related described items or any one of a plurality of related described items.

In addition, relative terms described based on the drawings, such as 'front', 'rear', 'top', 'bottom', etc. may be replaced with ordinal numbers such as 'first', 'second', etc.

In case of ordinal numbers such as 'first' and 'second', the order may be determined based on the order-of-mention or arbitrarily determined, and the order may be arbitrarily changed as necessary.

Terms used in the present disclosure are only for describing specific embodiments, and are not intended to limit the present disclosure. The singular expression includes the plural expression unless the context clearly dictates otherwise. Further, the terms "including" and "having" are used to designate that the features, the numbers, the steps, the elements, the components, or combinations thereof described in the specification are present, and are not to be understood as excluding the possibility that one or more other features, numbers, steps, elements, components, or combinations thereof may be present or added.

Unless otherwise defined, all terms, including technical terms and scientific terms, used herein have the same meaning as how they are generally understood by those of ordinary skill in the art to which the invention pertains.

Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments of the present disclosure will be described in detail with reference to the accompanying drawings. In addition, in the description of the present disclosure, if it is determined that a detailed description of a related known function or a known configuration may unnecessarily make the subject matter of the present disclosure unclear, the detailed description will be omitted.

EMBODIMENT

Figure 1:
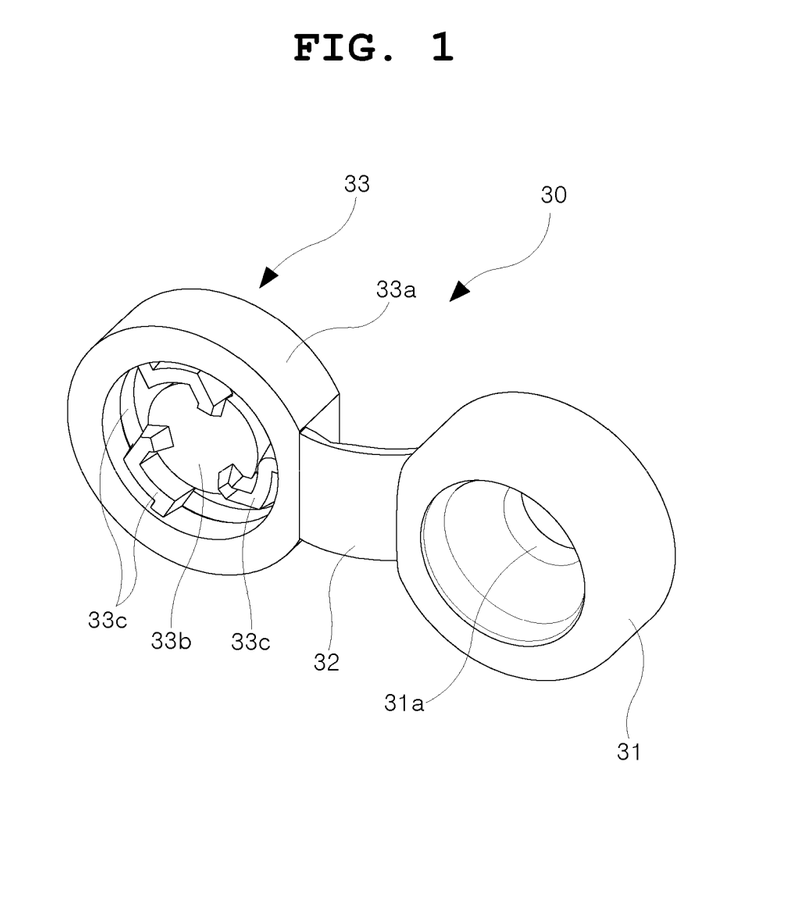
FIG. 1 is a perspective view showing an integrated check valve of the present disclosure.
Figure 2:
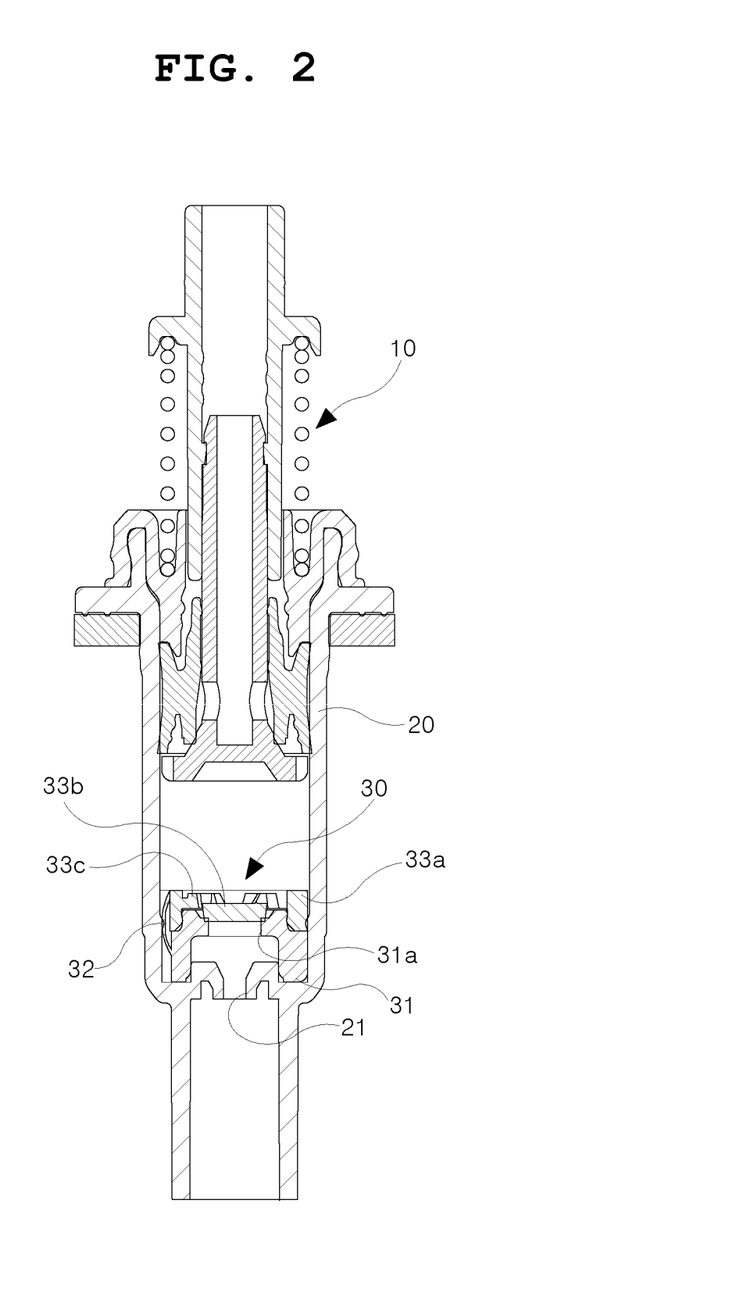
FIG. 2 is a sectional view showing a state in which an integrated check valve of the present disclosure is installed in a pump body.
Figure 3:
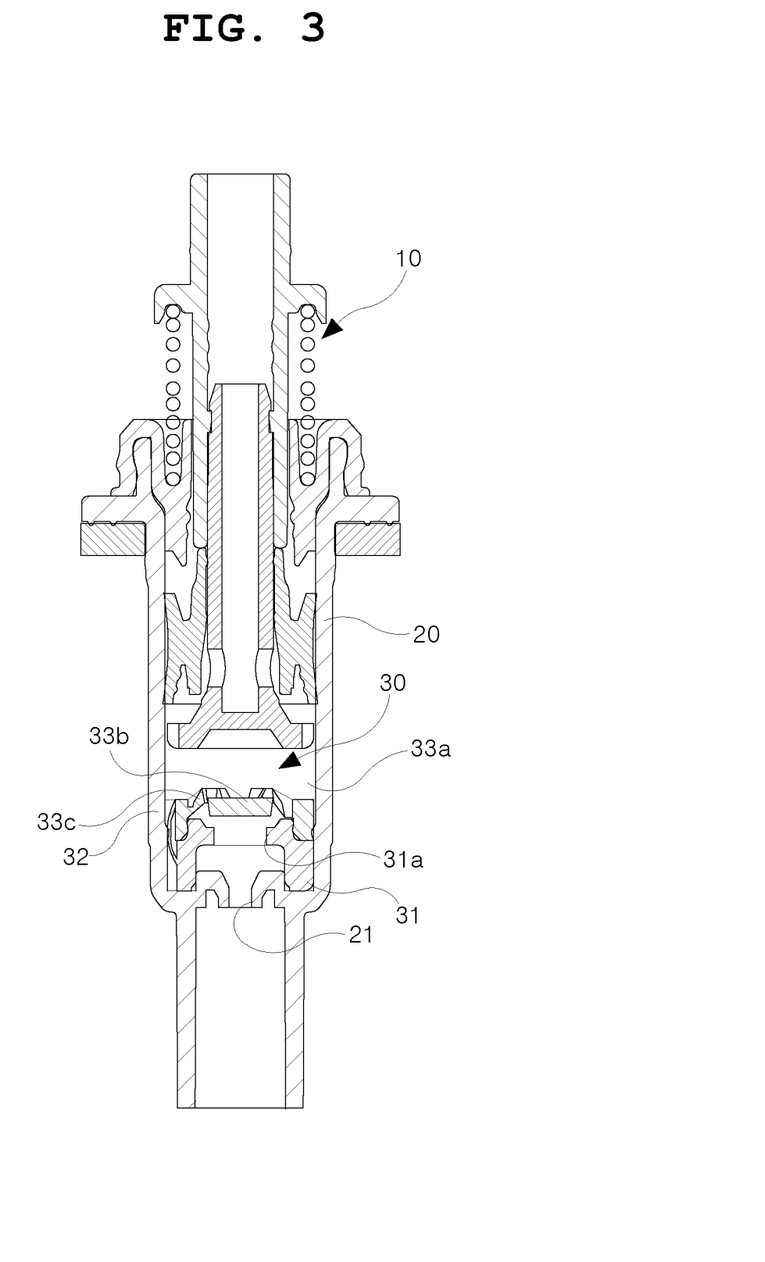
FIG. 3 is a sectional view showing an operational state of an integrated check valve when a pump of the present disclosure is operated.
Figure 4:
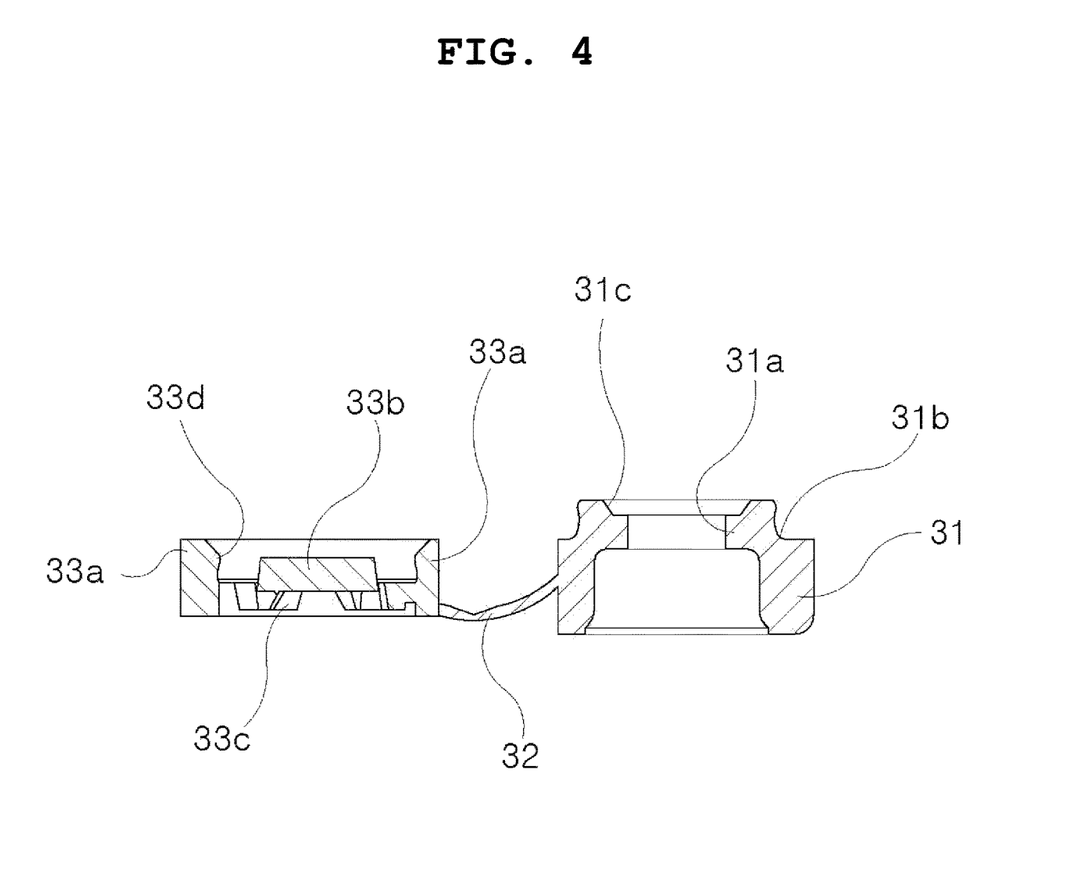
FIG. 4 is a sectional view showing an integrated check valve of the present disclosure.
Figure 5:
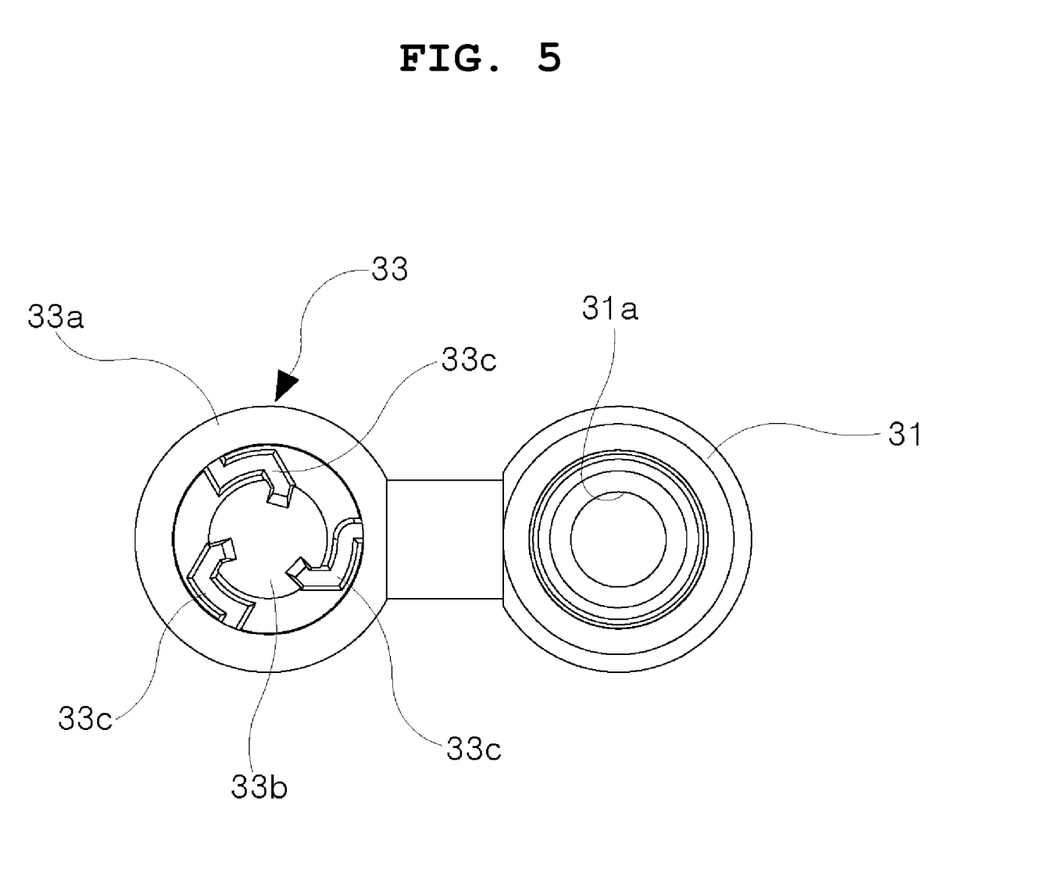
FIG. 5 is a plan view showing an integrated check valve of the present disclosure.
Figure 6:
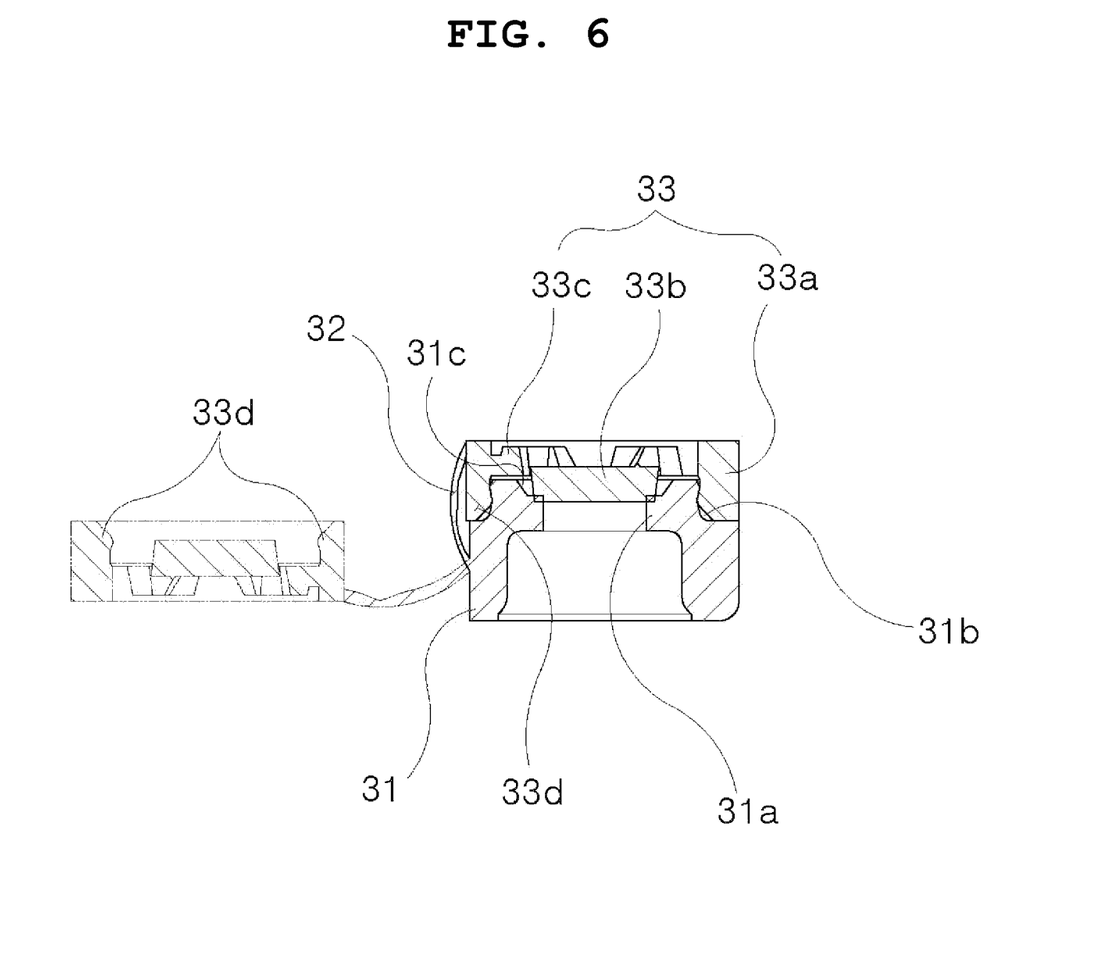
FIG. 6 is a sectional view showing an assembled state of an integrated check valve of the present disclosure.

FIG. 1 is a perspective view showing an integrated check valve of the present disclosure, FIG. 2 is a sectional view showing a state in which an integrated check valve of the present disclosure is installed in a pump body, FIG. 3 is a sectional view showing an operational state of an integrated check valve when a pump of the present disclosure is operated, FIG. 4 is a sectional view showing an integrated check valve of the present disclosure, FIG. 5 is a plan view showing an integrated check valve of the present disclosure, and FIG. 6 is a sectional view showing an assembled state of an integrated check valve of the present disclosure.

As shown above in FIGS. 1 to 6, the integrated check valve according to the present disclosure may include a valve body 31 which is a cylindrical member having open upper and lower parts, and which is inserted into an outer periphery of a center hole 21 of a cylinder 20 at which a pump body 10 is installed, and a cylindrical check valve 33 fitted and coupled to an upper surface of the valve body 31 while being connected thereto by a connecting strap 32 which is connected to a side surface of the valve body 31.

The cylindrical check valve 33 may include a cylindrical part 33a having open upper and lower parts, a disc opening and closing part 33b formed at a center of the cylindrical part 33a to open and close an upper hole 31a of the valve body 31, and S-shaped connecting parts 33c connecting an outer periphery of the disc opening and closing part 33b and an inner periphery of the cylindrical part 33a at a plurality of spots.

The pump body 10 is generally known in the art, so the detailed description thereof will be omitted.

As shown in FIG. 3, when the pump body 10 is operated, that is, when the piston moves down in the cylinder 20, the volume in the cylinder 20 is reduced, that is, the cylinder 20 is compressed so that the integrated check valve 30 is operated.

That is, as the volume in the cylinder 20 decreases, the disc opening and closing part 33b that has closed the upper hole 31a of the valve body 31 moves up by the pressure, so that cosmetic contents or other liquid contents are introduced through the central hole 21 of the cylinder 20.

When the pressing operation of the pump body 10 is stopped, the piston moves up, so that the cylinder 20 is filled with the cosmetic contents. Then, the disc opening and closing part 33b of the cylindrical check valve 33 moves down to close the upper hole 31a of the valve body 31 (see FIG. 2a).

As described above, the integrated check valve 30 of the present disclosure can be used independently without being used for the cylinder 20 on which the pump body 10 is mounted, and can also be used for a small pump of 0.03 cc.

That is, the integral check valve of the present disclosure can serve as a valve itself even if it is not combined with other components.

As described above, although specific embodiments have been described in the detailed description of the present disclosure, it is apparent that the technology of the present disclosure can be easily modified by those skilled in the art, and these modified embodiments may fall within the scope of the technical idea described in the claims.

INDUSTRIAL APPLICABILITY

According to the integrated check valve of the present disclosure, the valve body is attached to the hole to be opened and closed, and the check valve connected to the valve body is assembled on the valve body, thereby facilitating the assembly and disassembly of components and maintaining excellent pumping efficiency even when used for a long term. In addition, the integrated check valve according to the present disclosure can be used independently without being used in the cylinder in which the pump body is mounted, and can also be used in a small pump of 0.03 cc. That is, the integrated check valve according to the present disclosure itself can serve as a valve even if it is not combined with other components.

The invention claimed is:

1. An integrated check valve comprising:
a valve body (31) which is a cylindrical member having open upper and lower parts, and which is inserted into an outer periphery of a center hole (21) of a cylinder (20) at which a pump body (10) is installed; and
a cylindrical check valve (33) fitted and coupled to an upper surface of the valve body (31) while being connected thereto by a connecting strap (32) which is connected to a side surface of the valve body (31),
wherein the cylindrical check valve (33) includes:
a cylindrical part (33a) having open upper and lower parts;
a disc opening and closing part (33b) formed at a center of the cylindrical part (33a) to open and close an upper hole (31a) of the valve body (31); and
S-shaped connecting parts (33c) connecting an outer periphery of the disc opening and closing part (33b) and an inner periphery of the cylindrical part (33a) at a plurality of spots,
wherein the valve body (31) includes a guide slope (31c) and a protruding part formed on the inner periphery of the upper hole (31a) of the valve body (31),
wherein the disc opening and closing part (33b) is inserted into the guide slope (31c) and is in sealed contact with an upper part of the protruding part and
wherein the valve body (31) is constructed to be removably retained in the cylinder (20) by a friction fit and the cylindrical part (33a) is constructed to be removably retained by a first protrusion of the cylinder (20),
wherein the protruding part is continuously protruding toward center of the upper hole (31a) and an inner diameter of the protruding part is smaller than an inner diameter of the guide slope (31c) of the upper hole(31a),
wherein the cylindrical part (33a) and the valve body (31) share a substantially similar outer continuous cylindrical surface, and the connecting strap (32) is positioned substantially on and within the outer continuous cylindrical surface,
wherein the cylindrical part (33a) has a second protrusion and the valve body has a groove to receive the second protrusion,
wherein the first protrusion and the second protrusion are positioned on approximately the same height.

* * * * *